US008429980B2

United States Patent
Feldmeier

(10) Patent No.: US 8,429,980 B2
(45) Date of Patent: Apr. 30, 2013

(54) PRESSURE GAUGE AND DIAPHRAGM ADAPTER FOR USE WITH SANITARY CONDUIT

(75) Inventor: Robert H. Feldmeier, Fayetteville, NY (US)

(73) Assignee: Feldmeier Equipment Inc., Syracuse, NY (US)

( * ) Notice: Subject to any disclaimer, the term of this patent is extended or adjusted under 35 U.S.C. 154(b) by 145 days.

(21) Appl. No.: 13/182,842

(22) Filed: Jul. 14, 2011

(65) Prior Publication Data

US 2013/0014588 A1    Jan. 17, 2013

(51) Int. Cl.
*G01L 7/00* (2006.01)
*G01L 7/16* (2006.01)

(52) U.S. Cl.
USPC .............................................. 73/756; 73/744

(58) Field of Classification Search ............. 73/700–756
See application file for complete search history.

(56) References Cited

U.S. PATENT DOCUMENTS

| 3,982,437 | A | * | 9/1976 | Sekizawa ........................ 73/730 |
| 5,163,904 | A | * | 11/1992 | Lampropoulos et al. ........................ 604/100.02 |
| 2002/0194924 | A1 | * | 12/2002 | Ozawa ........................ 73/729.2 |
| 2004/0118186 | A1 | * | 6/2004 | Shultis ........................... 73/49.2 |
| 2007/0062297 | A1 | * | 3/2007 | Feldmeier ....................... 73/744 |

* cited by examiner

*Primary Examiner* — Andre Allen
(74) *Attorney, Agent, or Firm* — Bernhard P. Molldrem

(57) ABSTRACT

A pressure gauge adapter for sanitary conduit accepts a standard pressure gauge with a male threaded stem. The adapter has a flange to mate with an upper flange of a tubular stub where a diaphragm is positioned to serve as fluid barrier to block process liquid from leaving, and to serve as a seal gland. A hollow cylindrical wall rises from the flange member, with a sealing flange at its upper end. An elongated piston is situated within the hollow cylindrical wall with a lower head upon the lower diaphragm, and an upper head reaching the top end of the cylinder. A cap or dome situated above the cylinder has a flange member that mates with the upper flange member of the cylinder, with an upper diaphragm therebetween. The cap defines a space above the upper diaphragm, and is filled with a transfer liquid. A threaded bore in the cap accepts the threaded stem of the pressure gauge.

10 Claims, 1 Drawing Sheet

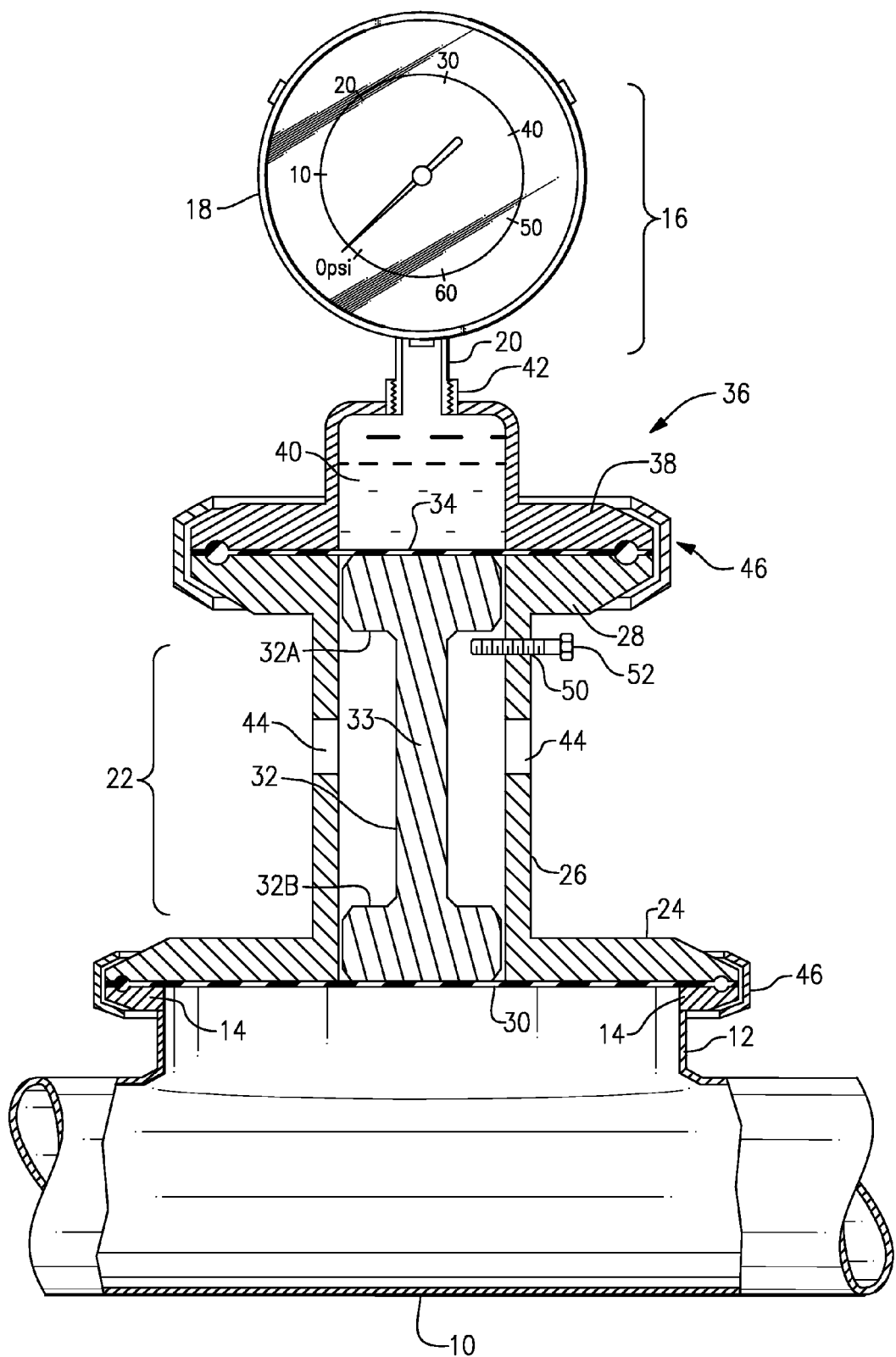

PRESSURE GAUGE AND DIAPHRAGM ADAPTER FOR USE WITH SANITARY CONDUIT

BACKGROUND OF THE INVENTION

This invention relates to monitoring equipment for processing of liquids used in products for human consumption, e.g., dairy products such as milk, cream, and ice cream mix, other liquid food products, e.g., fruit juices and soups, or pharmaceuticals. The invention is more particularly concerned with an adapter and a technique for employing a standard pressure gauge on sanitary conduits in which such liquid products are processed, and which permits the pressure gauge to be changed out or replaced when necessary, without incurring high material or labor costs and while maintaining sanitary conditions within the conduit. The invention is more specifically directed to a pressure gauge adapter which employs diaphragms and a piston to transmit the pressure of the process liquid to a working liquid which in turn transmits the process liquid pressure to the pressure gauge.

Pasteurization is a process for heat treating milk or other food or ingestible product in order to kill pathogens such as bacteria or other microorganisms. The U.S. Public Health Service has published standards for equipment for the pasteurization of milk and other milk products, and there are similar regulations concerning equipment for processing other products. By law, the milk or other product has to be heated to certain temperatures and held at a particular temperature. The pressures and pressure differentials of the product have to be closely monitored at certain points in the process. This means that working pressure gauges have to be present in the conduit, and must be replaced whenever they fail. On the other hand, in order to ensure that the sanitary conduit can be cleansed and sanitized between processes, the conduit is designed so that it can be completely cleaned of any milk or other product by washing it and rinsing it with a cleaning fluid that must reach every point on the interior of the conduit. No threaded connectors can be used anywhere that the liquid product flows, because of the difficulty in cleaning the threads.

Standard pressure gauges typically have a threaded stem that is used for securing the gauge into a threaded nipple in the associated equipment. However, there cannot legally be any threaded connections at any point at which the product would come into contact with the threads. Because these standard gauges rely on threaded connections to install them and hold them in place, an alternative technique has been employed for using pressure gauges and the like in sanitary conduits.

One technique that has been employed previously has been to install a diaphragm and flange disk onto the pressure gauge, and then to clamp the disk and diaphragm in place on top of an annular flange portion of a stub member that is affixed onto the conduit. A sanitary clamp, e.g., a so-called tri-clamp, compresses a sealing gland or ring between these two flanges, so there are no threads exposed to the product in the sanitary conduit. Unfortunately, these specially constructed gauges are many times more costly than the standard pressure gauges, and thus much more expensive to replace.

In addition, the standard pressure gauge and the diaphragm type gauge mentioned above do not have any means for disclosing a leak or a failure of a seal within the gauge assembly.

In a regenerative heat exchanger of the type that is used in many pasteurizers, critical temperature differences have to be maintained between the raw product side and the pasteurized product side (typically, only a few degrees). To achieve this, flow rates must be kept within narrow limits, which requires critical pressure differentials. For efficient operation it is important to monitor pressure there very closely. It is also desirable to be able to replace a gauge quickly when it fails, and to employ standard gauges of relatively low cost, yet still of acceptable accuracy.

OBJECTS AND SUMMARY OF THE INVENTION

It is an object of the present invention to provide a pressure gauge arrangement that can be easily installed for use in conduits for liquid food products, and which avoids the drawbacks of the prior art.

It is another object to provide an adapter that permits installation of a standard type of pressure gauge on a sanitary conduit, while avoiding any threaded connectors being in contact with the liquid product.

It is a further object to provide an arrangement that is straightforward in construction, and which facilitates installation and change-out of the pressure gauge.

According to one aspect of the invention, a pressure gauge adapter is provided for use in connection with a sanitary conduit, e.g., a product-product heat exchanger of a pasteurizer, through which a liquid product, e.g., milk, flows. The pressure of the product is to be monitored as the product flows through the conduit. At various pressure measuring points along the conduit there are tubular stubs for mounting pressure gauges. Each of these tubular stubs permits communication of pressure to the gauge from the fluid. The pressure gauge is a standard type of gauge with a body portion and a male threaded stem for attaching to a female-threaded gauge fitting on the adapter.

In any of various preferred embodiments, the adapter has a flange member of a diameter to mate with an upper flange of the tubular stub. A first diaphragm is positioned here between the flange member of the adapter and the upper flange of the tubular stub, and serves as a fluid barrier to prevent the process liquid from leaving, and also serves as a seal gland. A tri-clamp or equivalent sanitary clamp means holds the flange member in sealed engagement with the tubular stub. A cylinder rises from the flange member, and has a hollow cylindrical wall and a sealing flange at its upper end. An elongated piston is situated within the hollow cylindrical wall with a lower end situated upon said lower diaphragm, and an upper end that reaches the top end of the cylinder. The piston enjoys sliding motion in the cylinder over some limited range of axial motion. A cap member is situated above the cylinder and has a flange member arranged to mate with the upper flange member of the cylinder. The cap member defines a space above the cylinder and piston. The cap member having a threaded bore therein to accept the threaded stem of the pressure gauge. The pressure gauge has its stem fitted into the threaded bore of the cap member.

An upper diaphragm is disposed between the upper flange member of the cylinder and the flange member of the cap member. The upper diaphragm closes off the space defined within said cap member. The upper end of the piston contacts the upper diaphragm.

There is a fill of a non-compressible transfer fluid, i.e., pressure transmitting liquid (which can be oily or aqueous, as needed for a given application) within the cap member space above second or upper diaphragm. The liquid can be, e.g., water, glycol, or another fluid of the type that is commonly used for such purposes. The piston is in contact with both the upper and lower diaphragms, and is able to transmit pressure from the process liquid (below the lower diaphragm) to the pressure-transmitting liquid (above the upper diaphragm), so that the pressure gauge shows the pressure of the process liquid.

The piston is formed of a material of low thermal conductance, e.g., stainless steel, and can be in the form of a spool or dog-bone, with upper and lower heads joined by a narrow rod or bar member to minimize heat transfer between the process fluid and the pressure transfer fluid. Alternatively, the piston could be formed of carbon. The cylinder has at least one aperture through the cylindrical wall thereof to provide a visual indication of leakage in the case of a failure of either of the lower and upper diaphragms. Preferably, there are two or more leakage detecting apertures in the cylinder.

In preferred embodiments, the diaphragms may be silicone rubber (food grade) or may be and EPDM material (ethylene-propylene diene monomer). The cylinder of the adapter may be formed of a stainless steel so as to have high mechanical strength and a low thermal conductance.

The cylinder and piston can be relatively tall, so as to isolate the pressure transmitting liquid within the cap portion of the adapter from hot process liquids below the adapter. Preferably the cylinder and the piston can have a length to diameter ratio of between about 1.5 to 2.5.

In a favorable implementation, the flanges at the top and at the base of the cylinder have a radially tapered outer edge adapted to receive a standard sanitary tri-clamp. The pressure gauge may be of any standard design, and may employ a mechanical or aneroid sensor mechanism, a load cell detector mechanism, or any other system, which may be of conventional design. The gauge may employ either a standard needle dial or a digital display, or may provide an electrical output for remote monitoring. In other embodiments, the flange need not have a strictly circular profile, so long as it is capable of mating with the upper flange of the associated tubular stub.

The processing equipment associated with this invention may be used for whole milk, skim milk, cream, or other dairy products such as flavored milk or ice cream mix. The arrangements of this invention may also be used for processing orange juice, grapefruit juice, apple juice, or other fruit juices. The equipment may be of a tubular heat exchanger design, and may be cleaned-in-place with a minimum of down time. A triple-tube heat exchanger that is suitable for use in various possible processes is described in Feldmeier U.S. Pat. No. 3,386,497, which is incorporated herein by reference.

The above and many other objects, features, and advantages of the arrangements and techniques of the present invention will become apparent from the ensuing detailed description of a preferred embodiment of the invention, when considered in connection with the accompanying Drawing.

BRIEF DESCRIPTION OF THE DRAWING

The Sole Drawing FIGURE shows an adapter according to one embodiment of the invention.

DETAILED DESCRIPTION OF THE PREFERRED EMBODIMENT

The pressure gauge and adapter of the present invention can be employed in connection with a pasteurization process such as that described in my U.S. Pat. No. 7,186,430, Mar. 6, 2007, which is incorporated herein by reference.

With initial reference to the sole FIGURE, the invention may be employed on a tubular sanitary conduit 10, which may be of the type that processes a dairy product, such as milk or ice cream mix, another edible product such as fruit juice, sauce or soup, or a pharmaceutical product for human or veterinary use. In this case, a tubular stub 12 rises from one side of the conduit 10, and provides a location for installing a gauge. The stub 12 has a ring flange 14 at its upper end. The ring flange 14 has a flat upper surface and a tapered lower surface.

An industrial pressure gauge 16 here represents any of a large variety of suitable gauges, of various types and having a variety of pressure ranges, depending on the application. In this example, the gauge 16 has a body portion 18 that is disposed outside the conduit 10. There, the body portion 18 is of a generally cylindrical or disk shape, with a dial, indicator needle, face with pressure gradations, and a cover glass or lens. Alternatively, the gauge could have a digital display or could simply have conductors emerging to lead away toward a pressure display on a control panel or console. As is standard in these gauges, a stem 20 having male threads emerges from the body portion 18.

Atop the tubular stub 12 is situated a cylinder 22 with a flange ring 24 facing the ring flange 14, and with a cylindrical wall 26 that extends upwards from the flange ring 24. There is an upper ring flange 28 at the top of the cylindrical wall 26. A lower diaphragm 30, formed of a sheet of flexible, resilient food-grade material, e.g., silicone rubber or EPDM, is situated between the facing surfaces of the ring flange 14 and the flange ring 24, serving as a seal gland between the flanges and also serving as a barrier to the process fluid below the diaphragm 30.

A piston 32 is situated within the cylinder and has a generally cylindrical lower head 32B that rests on the diaphragm 30 and a similar upper head 32A that extends even with the top of the cylinder 24. The heads 32A and 32B of the piston have nearly the same diameter as the inside diameter of the cylindrical wall 26, but have enough play to permit some sliding action. The heads 32A and 32B are joined by a bar or rod 33 of a smaller diameter, so as to minimize transfer of heat between the process fluid in the conduit 10 and the pressure transfer fluid associated with the gauge 16. This piston 32 is formed of a material of good strength characteristics but with a low thermal conductivity. In a preferred embodiment, the piston is formed of a stainless steel. There is an upper diaphragm 34 situated across the top of the cylinder 32 and the upper ring flange 28.

The upper diaphragm 34 at the upper end of the cylinder 22 is in contact with the upper end of the piston 32. This diaphragm 34 may be made of the same flexible, resilient sheet material as the lower diaphragm, or may be made of other material as it is not in contact with the process fluid. A cap member 36 or dome is situated above the cylinder 22 and piston 32, and includes a flange ring 38 that mates with the upper ring flange 28 of the piston. The diaphragm 34 extends between the flange ring 38 and ring flange 28 and serves as a seal gland and also serves to block flow of fluid from the cap member 36 into the cylinder. The cap member 36 defines an enclosed space 40 above the upper diaphragm 34, and is filled with a suitable transfer fluid, e.g., water or glycol. The cap 36 also has a threaded aperture or fitting 42 that mates with the threaded stem 20 of the pressure gauge 16. Here the enclosed space 40 within the cap 36 has the same inside diameter as does the cylindrical wall 26.

Approximately midway along the cylindrical wall 26 of the stainless steel cylinder 22 are two (or more) leakage detection openings 44. These serve as failure disclosure indicators. In case of a failure of either diaphragm 30 or 34, liquid will begin to leak out through one or both of the openings 44 and will provide a visible indication of leakage. The leak detector holes 44 will serve as an outlet for any fluid that may leak past one or the other of the two diaphragms, and provide a visible indication of leakage or diaphragm failure. Normally, the diaphragms 30 and 34 will keep the annular space between the cylindrical wall 26 and piston 32 dry and free of any fluid. However, if either the edible food product or the pressure transmitting fluid does leak through or past the respective diaphragm, noticeable droplets will form at the leak detector openings 44.

In this embodiment, the lower flange rings 14 and 24 are held together by means of a tri-clamp 46, and the upper set of flange rings 28 and 38 are also held together by means of a tri-clamp 46.

In this embodiment, a threaded bore 50 is provided in the upper part of the cylindrical wall 26 to receive a stop screw 52. The stop screw 52 extends beneath the upper head 32A of the piston to limit downward movement of the piston 32. This can prevent damage to the diaphragm 30 in the event of a sudden pressure drop inside the conduit 10.

The stainless steel cylinder 22 and piston 32 each have low heat transfer characteristics, and serve to isolate the transfer fluid within the space 40 of the cap from the liquid product in the sanitary conduit 10, which may be at a temperature of 300° F. or higher in the case of a pasteurizer. The outer surface of the cylindrical wall 26 also serves an air-cooling surface to further protect the transfer fluid from high temperatures.

Alternative embodiments of the invention could have pistons made of alternative materials, or with incorporated voids. Other suitable materials may be used for the diaphragms.

While the invention has been described with reference to a selected embodiment, it should be recognized that the invention is not limited to that precise embodiment. Rather, many modifications and variations will be apparent to persons skilled in the art without departing from the scope and spirit of this invention, as defined in the appended claims.

I claim:

1. Pressure gauge adapter for use in connection with a sanitary conduit through which a liquid product flows whose pressure is to be monitored, the conduit including tubular stub formed on said conduit to mount a pressure gauge and to permit communication of pressure to said gauge from said fluid; and wherein said pressure gauge has a body portion and a male-threaded stem for attaching to a female-threaded gauge fitting; the adapter comprising:
    a flange member of a diameter to mate with an upper flange of said tubular stub;
    a lower diaphragm disposed between said flange member and said upper flange blocking any flow therepast of said liquid product, and sealing between the flange member and the upper flange of the tubular stub;
    a cylinder having a hollow cylindrical wall rising from said flange member and having an upper flange member at its upper end;
    a piston situated within said hollow cylindrical wall with a lower end situated upon said lower diaphragm, and an upper end;
    a cap member situated above said cylinder and having a flange member arranged to mate with the upper flange member of said cylinder, the cap member defining an enclosed space above said cylinder and said piston; and said cap member having a threaded bore therein to accept the threaded stem of said pressure gauge;
    an upper diaphragm disposed between the upper flange member of said cylinder and the flange member of said cap member and closing off the space defined within said cap member, the upper diaphragm contacting thee upper end of said piston;
    a fill of a non-compressible pressure transmitting liquid within said cap member above said second diaphragm; and
    said pressure gauge having its stem fitted into the threaded bore of said cap member;
    wherein said piston is formed so as to have a low thermal conductance; and wherein said cylinder has at least one aperture through the cylindrical wall thereof to provide a visual indication of leakage in the case of a failure of either of said lower and upper diaphragms.

2. Pressure gauge adapter according to claim 1, wherein one or more of said diaphragms are formed of a silicone rubber.

3. Pressure gauge adapter according to claim 1, wherein one or more of said diaphragms are formed of an EPDM.

4. Pressure gauge adapter according to claim 1, wherein said cylinder has two or more apertures through said cylindrical wall thereof.

5. Pressure gauge adapter according to claim 1, wherein said cylinder has a length to diameter ratio of about 1.5 to 2.5.

6. Pressure gauge adapter according to claim 1, wherein said piston has a length to diameter ratio of about 1.5 to 2.5.

7. Pressure gauge adapter according to claim 1, wherein said piston is formed of a stainless steel.

8. Pressure gauge adapter according to claim 7, wherein said piston is in the form upper and lower heads of a diameter that is nearly the inside diameter of the cylindrical wall, with a rod member of smaller diameter joining the upper and lower heads.

9. Pressure gauge adapter according to claim 1, wherein said piston is formed of carbon.

10. Pressure gauge adapter according to claim 1, wherein said cylindrical wall is formed of a stainless steel.

* * * * *